(12) United States Patent
Ackerman

(10) Patent No.: US 11,488,417 B2
(45) Date of Patent: Nov. 1, 2022

(54) IRIS AND PERIOCULAR REGION BIOMETRIC RECOGNITION

(71) Applicant: Princeton Identity, Hamilton, NJ (US)

(72) Inventor: David Alan Ackerman, Hopewell, NJ (US)

(73) Assignee: Princeton Identity, Hamilton, NJ (US)

( * ) Notice: Subject to any disclaimer, the term of this patent is extended or adjusted under 35 U.S.C. 154(b) by 0 days.

(21) Appl. No.: 17/231,113

(22) Filed: Apr. 15, 2021

(65) Prior Publication Data

US 2021/0383111 A1 Dec. 9, 2021

Related U.S. Application Data

(60) Provisional application No. 63/036,481, filed on Jun. 9, 2020.

(51) Int. Cl.
| | |
|---|---|
| *G06V 40/18* | (2022.01) |
| *G06V 40/19* | (2022.01) |
| *G06V 40/40* | (2022.01) |
| *G06V 40/16* | (2022.01) |

(52) U.S. Cl.
CPC .......... *G06V 40/197* (2022.01); *G06V 40/161* (2022.01); *G06V 40/19* (2022.01); *G06V 40/193* (2022.01); *G06V 40/40* (2022.01)

(58) Field of Classification Search
None
See application file for complete search history.

(56) References Cited

U.S. PATENT DOCUMENTS

| | | | | |
|---|---|---|---|---|
| 2019/0392145 | A1* | 12/2019 | Komogortsev | G06F 21/32 |
| 2020/0097704 | A1* | 3/2020 | Storm | G06V 40/167 |
| 2021/0110018 | A1* | 4/2021 | Rowe | G06N 20/00 |
| 2021/0383111 | A1* | 12/2021 | Ackerman | G06V 40/161 |

OTHER PUBLICATIONS

Raghavendra, et al, "Combining Iris and Periocular Recognition using Light Field Camera", Nov. 2013, IEEE, pp. 155-159 (Year: 2013).*

* cited by examiner

*Primary Examiner* — Edward Park
(74) *Attorney, Agent, or Firm* — Young Basile Hanlon & MacFarlane, P.C.

(57) ABSTRACT

Disclosed herein are methods, apparatus, and systems for iris and periocular biometric recognition. A method for biometric recognition includes capturing one or more image frames of at least a facial portion of a user, determining an iris image portion and a periocular region image portion from the one or more image frames, performing iris encoding on a live iris image portion to generate an iris template, performing periocular region encoding on a live periocular region image portion to generate a periocular region template, performing iris matching on the iris template to generate an iris result, performing periocular region matching on the periocular region template to generate a periocular region result, and using one or more of the iris result and the periocular region result to enable the user to access an object.

19 Claims, 6 Drawing Sheets

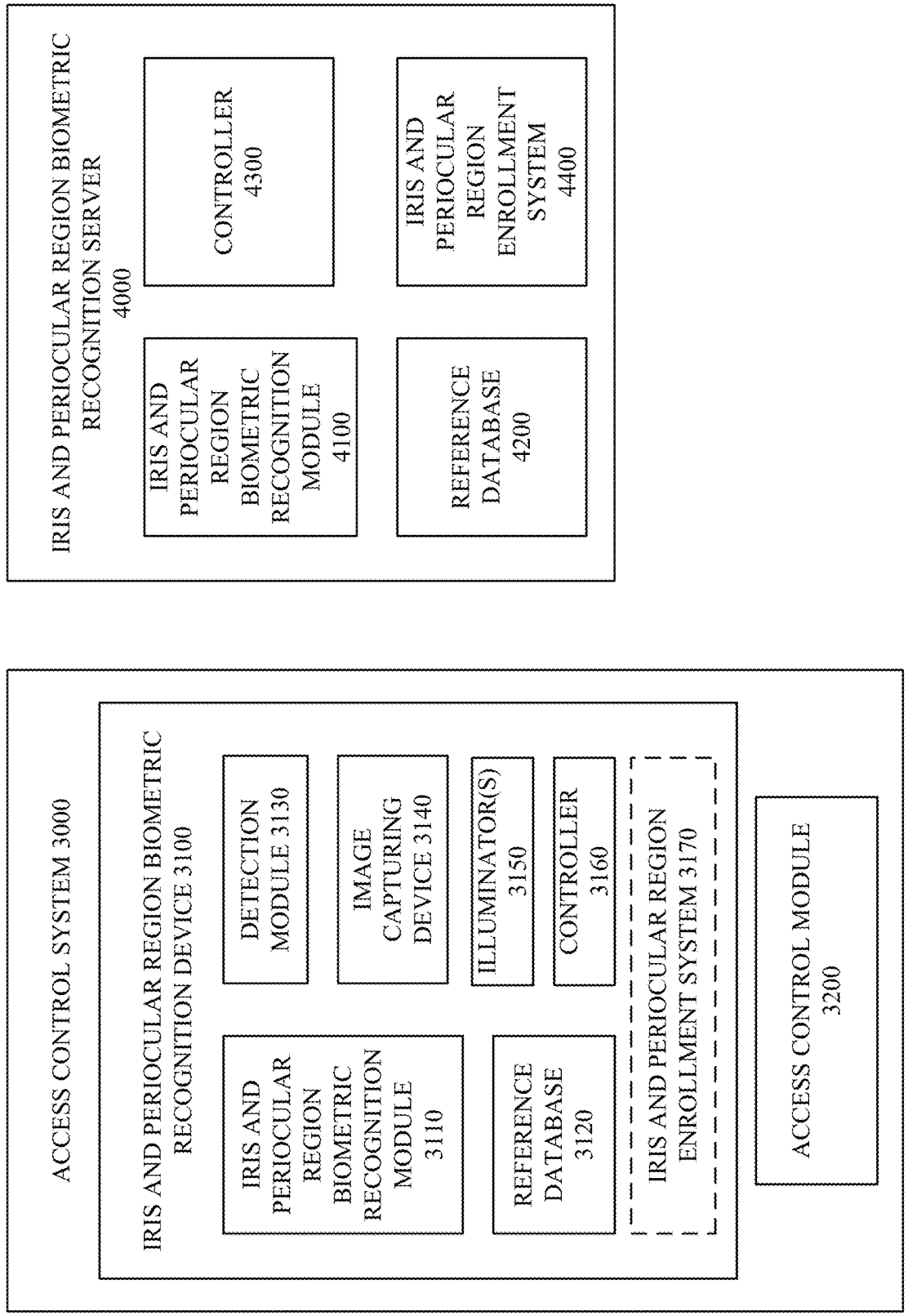

IRIS AND PERIOCULAR REGION BIOMETRIC RECOGNITION

CROSS-REFERENCE TO RELATED APPLICATION

This application claims priority to U.S. Provisional Application No. 63/036,481, filed on Jun. 9, 2020, the contents of which are incorporated by reference herein.

TECHNICAL FIELD

This disclosure relates to biometric recognition. More specifically, this disclosure relates to iris and periocular region biometric recognition.

BACKGROUND

Individuals can be recognized using a variety of biometric methods, e.g., face, fingerprint, and irises. Some of these biometric methods, such as fingerprint recognition methods, require individuals to touch or contact the biometric recognition device. This can be difficult for some individuals or during periods where users of such biometric recognition systems do not want to touch any surfaces that might have been contaminated by other individuals. Consequently, the use of such biometric recognition systems are shunned.

Other biometric methods, such as face recognition methods, require capturing an image of the face. This can be impossible with respect to some individuals due to cultural or religious requirements which necessitate the use of face coverings or face masks. Moreover, individuals may be using masks to avoid exposure to contagions, pollution, and the like. In these situations, the use of face recognition systems are crippled.

SUMMARY

Disclosed herein are methods, apparatus, and systems for iris and periocular biometric recognition.

In implementations, a method for biometric recognition includes capturing one or more image frames of at least a facial portion of a user, determining an iris image portion and a periocular region image portion from the one or more image frames, performing iris encoding on a live iris image portion to generate an iris template, performing periocular region encoding on a live periocular region image portion to generate a periocular region template, performing iris matching on the iris template to generate an iris result, performing periocular region matching on the periocular region template to generate a periocular region result, and using one or more of the iris result and the periocular region result to enable the user to access an object.

In implementations, the determined iris image portion and the determined periocular region image portion are exchanged to assist in the determining of the periocular region image portion and the iris image portion, respectively. In implementations, the method further includes performing anti-spoofing analysis on the determined iris image portion and the determined periocular region image portion to determine user liveness. In implementations, the results from the anti-spoofing analysis on the determined iris image portion and the results from the anti-spoofing analysis on the determined periocular region image portion are exchanged to assist in the anti-spoofing analysis on the determined periocular region image portion and the anti-spoofing analysis on the determined iris image portion, respectively. In implementations, the iris matching information and the periocular region matching information are exchanged to assist in the periocular region matching and the iris matching, respectively. In implementations, the method further includes generating a biometric recognition result by fusing the iris result and the periocular region result. In implementations, wherein the one or more image frames is one or more near-infrared image frames and one or more visible image frames. In implementations, the one or more near-infrared image frames and one or more visible image frames is one near-infrared image frame and one visible image frame. In implementations, the one or more image frames is one or more near-infrared image frames. In implementations, the one or more near-infrared image frames is one near-infrared image frame. In implementations, the determined periocular region image portion is used to screen and obtain a subset of entries from a database having a threshold probability. In implementations, the iris result is based on the subset of entries. In implementations, the determined iris image portion is used to screen and obtain a subset of entries from a database having a threshold probability. In implementations, the periocular region result is based on the subset of entries.

In implementations, a method for biometric recognition includes capturing one or more near-infrared image frames of at least a facial portion of a user, determining an iris image portion and a periocular region image portion from one near-infrared image frame of the one or more near-infrared images, wherein the determined iris image portion and the determined periocular region image portion are exchanged to assist in the determining of the iris image portion and the periocular region image portion respectively, determining usability of the determined iris image portion and the determined periocular region image portion, performing anti-spoofing analysis on the usable determined iris image portion and the usable determined periocular region image portion to determine user liveness, performing iris encoding on a live iris image portion to generate an iris template, performing periocular region encoding on a live periocular region image portion to generate a periocular region template, performing iris matching on the iris template to generate an iris result, performing periocular region matching on the periocular region template to generate a periocular region result, wherein iris matching information and periocular region matching information are exchanged to assist in iris matching and periocular region matching respectively, generating a biometric recognition result by fusing the iris result and the periocular region result, and using the biometric recognition result to enable the user to access an object.

In implementations, results from the anti-spoofing analysis on the usable determined iris image portion and the results from the anti-spoofing analysis on the usable determined periocular region image portion are exchanged to assist in the anti-spoofing analysis on the usable determined periocular region image portion and the anti-spoofing analysis on the usable determined iris image portion, respectively. In implementations, the method further includes capturing one or more visible image frames of at least a facial portion of a user, wherein at least one of the one or more near-infrared image frames and the one or more visible image frames is used for periocular region recognition.

In implementations, a biometric recognition device includes an image capture device configured to capture one or more image frames of at least a facial portion of a user, and a processor connected to the image capture device. The processor configured to determine an iris image portion and a periocular region image portion from the one or more image frames, perform iris encoding on a live iris image portion to generate an iris template, perform periocular region encoding on a live periocular region image portion to generate a periocular region template, perform iris matching on the iris template to generate an iris result, perform periocular region matching on the periocular region template to generate a periocular region result, and use one or more of the iris result and the periocular region result to enable the user to access an object.

In implementations, the processor configured to perform at least one of exchange the determined iris image portion and the determined periocular region image portion to assist in determining the periocular region image portion and the iris image portion, respectively, exchange anti-spoofing analysis results performed on the determined iris image portion and performed on the determined periocular region image portion to assist in anti-spoofing analysis on the determined periocular region image portion and anti-spoofing analysis on the determined iris image portion, respectively, and exchange the iris matching information and the periocular region matching information to assist in the periocular region matching and the iris matching, respectively.

In implementations, the image capture device is an infrared image capture device configured to capture one or more near-infrared images.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 3 is a diagram of an example access control system with an example iris and periocular region biometric recognition device in accordance with implementations of this disclosure.

FIG. 4 is a diagram of an example iris and periocular region biometric recognition server for use with the access control system of FIG. 3 in accordance with implementations of this disclosure.

DETAILED DESCRIPTION

Figure 1:
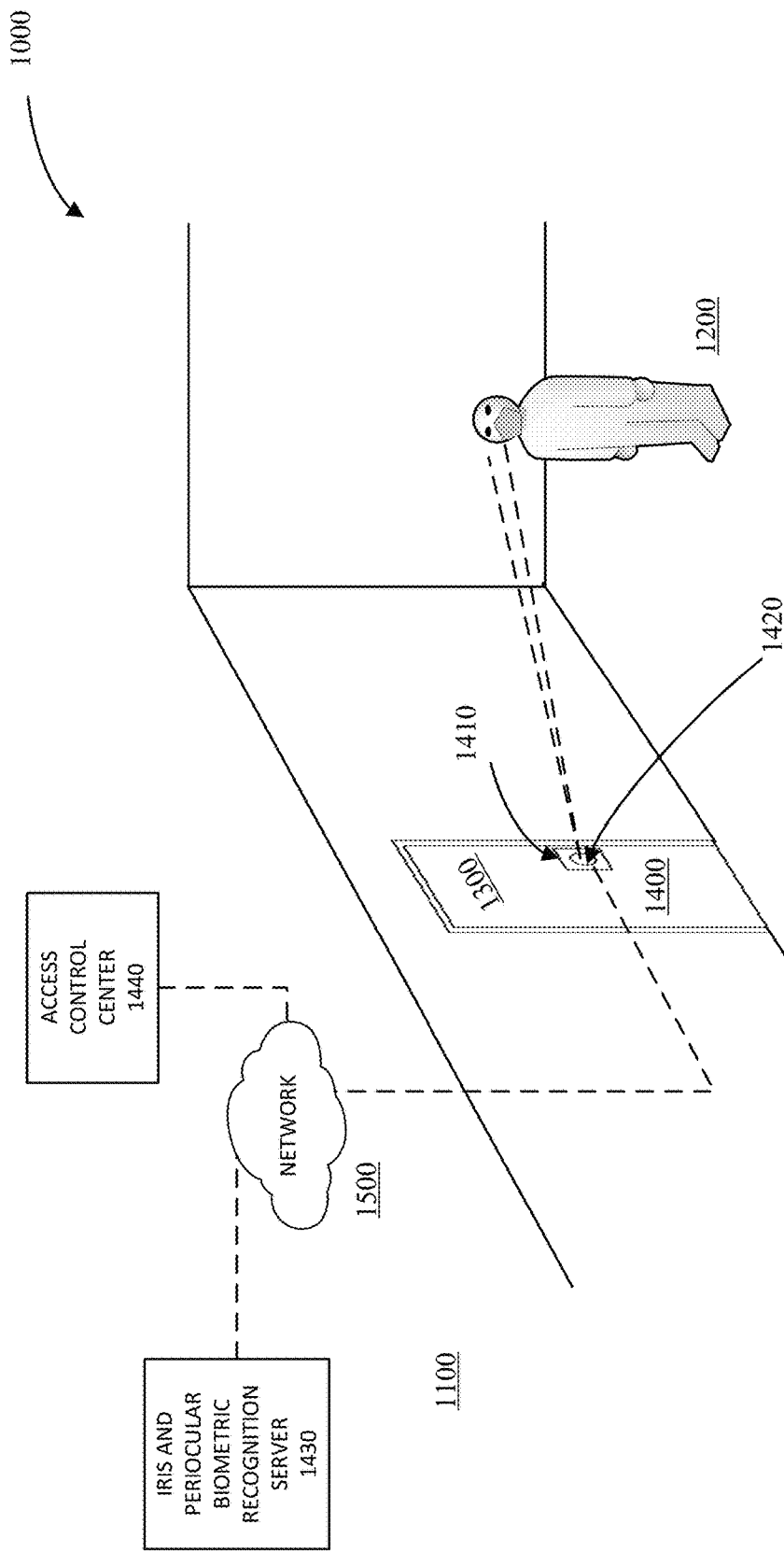
FIG. 1 is a diagram of an example architecture for iris and periocular region biometric recognition in accordance with implementations of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, access control, iris and periocular region recognition, and the like. The unit of executable software generally runs in a predetermined environment, computing device, server, and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element"

indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, apparatus, and systems for iris and periocular region biometric recognition. A dual biometric modality system includes iris recognition and periocular region recognition. The dual biometric modality system is a touchless or contactless system which operates with users using facemasks for a variety of reasons including, but not limited to, health, religious, cultural, and the like. The combined modalities of the dual biometric modality system enables higher user-inclusivity, accuracy, speed, and resistance to spoofing. In implementations, the iris and periocular region biometric recognition can be used for access control to a variety of facilities and events, access to stored objects, and the like.

In implementations, a combined iris recognition and periocular region recognition system provides enhanced inclusivity for individuals that cannot use the iris modality due to physical, biological, or physiological constraints, limitations, or the like. The periocular region recognition system uses the regions surrounding the eyes including, for example, the eye sockets, lids, eyebrows, and surrounding typically textured skin. The combined iris recognition and periocular region recognition provides inclusivity for individuals that cannot use the iris modality. The combined iris recognition and periocular region recognition is less error-prone than a one modality system since each of the iris and periocular region modalities access or use substantially independent information and make uncorrelated errors. The combined iris recognition and periocular region recognition provides enhanced anti-spoofing mechanisms which are more difficult to overcome. Each of the iris and periocular region modalities has its own set of anti-spoofing mechanisms or strategies. In implementations, both sets of anti-spoofing mechanisms have to be overcome. In addition, the presence of both iris and periocular recognition systems enables synergistic anti-spoofing strategies that exploit properties of the systems in combination and that are difficult to defeat. In implementations, the combined iris recognition and periocular region recognition can enhance operational and functional speed with respect to databases having a large number of entries, for example millions of entries. The faster, less selective modality can screen the database to obtain a subset of entries with a threshold probability. The subset of entries can then be quickly analyzed (in comparison to analyzing the entire database) using the relatively slower but more accurate modality. In implementations, the faster, less selective modality is the periocular region modality and the slower but more accurate modality is the iris modality. In implementations, the faster, less selective modality can depend on the methods used for the iris and periocular region modalities. In implementations, the order of the methods used for the iris and periocular region modalities are interchangeable.

In implementations, an iris and periocular region biometric recognition system can use near infrared camera and illuminator subsystems to capture and produce a stream of near infrared images. In implementations, a single near infrared frame can be used for iris and periocular region recognition. In such implementations, additional hardware is not needed. Iris and periocular region analysis of each frame enhances recognition over standard iris-only systems. Visible based cameras and illumination are not required for capturing the iris and periocular regions.

In implementations, an iris and periocular region biometric recognition system can use a combination of near infrared camera and illuminator subsystems to capture and produce a stream of near infrared images and visible camera and illuminator subsystems to capture and produce a stream of visible images. The iris and periocular region biometric recognition system can use the near infrared frames for iris recognition. The iris and periocular region biometric recognition system can use either or both of the near infrared frames and the visible frames for periocular region recognition. In implementations, the visible camera can use applied visible light. In implementations, the visible camera can also use ambient light in lieu of illuminator subsystems in either the near infrared or visible spectral ranges.

FIG. 1 is a diagram of an example architecture or system 1000 for iris and periocular region biometric recognition in accordance with implementations of this disclosure. In implementations, the architecture or system 1000 can be deployed, provided, or implemented in warehouses, offices, buildings, residences, hospitals, nursing homes, rehabilitation centers, vaults, airports, concerts, and other facilities or events. In implementations, the architecture 1000 can include a room or building 1100 which is accessed by a user 1200 via a door 1300. The door 1300 is illustrative of an access controlled facility, object, and the like (collectively "access controlled entity"). In implementations, the user 1200 can be wearing a mask 1210 which covers a portion of a face of the user 1200. The door 1300 can be opened or unlocked by an access control system 1400. In implementations, the access control system 1400 includes an iris and periocular region biometric recognition device 1410 and an access control module 1420. In implementations, the access control system 1400 includes the iris and periocular region biometric recognition device 1410, the access control module 1420, and an iris and periocular region biometric recognition server 1430. In implementations, the access control system 1400 includes the iris and periocular region biometric recognition device 1410, the access control module 1420, and an access control center 1440. In implementations, the access control system 1400 includes the iris and periocular region biometric recognition device 1410, the access control module 1420, the iris and periocular region biometric recognition server 1430, and the access control center 1440. In implementations, the iris and periocular region biometric recognition device 1410, the access control module 1420, the iris and periocular region biometric recognition server 1430, and the access control center 1440, as appropriate and applicable, are connected or in communication (collectively "connected") using a network 1500. The architecture 1000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 2:
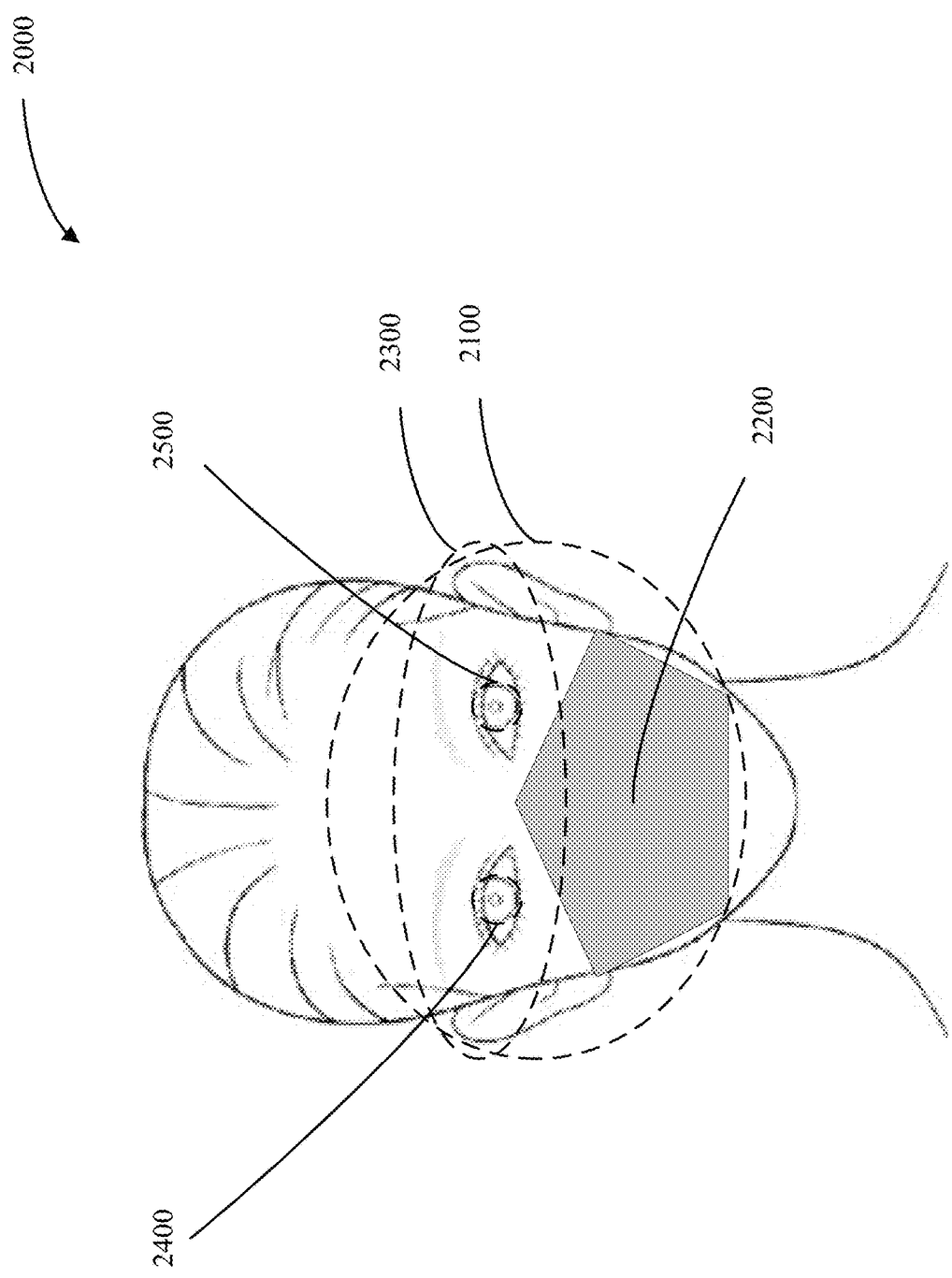
FIG. 2 is a diagram of an example face with image portion areas for iris and periocular region biometric recognition in accordance with implementations of this disclosure.

Facial recognition systems capture an image of a face of a user to perform facial recognition. For example, as shown in FIG. 2, a facial recognition system captures an image of a face 2100 of a user 2000 to perform the facial recognition. In some instances, the user 2000 can be wearing a mask 2200 over some parts of the facial region 2100. Often in these instances, facial recognition is not possible. Referring now to both FIG. 1 and FIG. 2, the iris and periocular region biometric recognition device 1410 is a touchless and contactless device for recognizing a user. The iris and periocular region biometric recognition device 1410 captures one or more images of the user 2000. The one or more images include a periocular region 2300 with sufficient resolution to capture iris texture for one or more of the irises 2400 and 2500. The iris and periocular region biometric recognition device 1410 finds the periocular region 2300 and the one or both irises 2400 and 2500 and extracts the relevant features, characteristics, and the like. Iris and periocular region templates are formed from the extracted information. Each of the templates are matched against enrolled iris and periocular region templates to determine if the user 2000 has access. An access signal is generated based on the results of the matching. In an implementation, the iris and periocular region biometric recognition device 1410 is a standalone device. In an implementation, the iris and periocular region biometric recognition device 1410 can communicate with the iris and periocular region biometric recognition server 1430 and the access control center 1440 to collectively determine access based on the matching results.

The access control module 1420 can receive the access signal from the iris and periocular region biometric recognition device 1410. The access control module 1420 can open or unlock the door 1300 based on the access signal. In implementations, the access control module 1420 can send a signal to a lock/unlock device (not shown) on the door 1300 to open or unlock. In implementations, the access control module 1420 can receive the access signal from the access control center 1440. In implementations, the access control module 1420 can receive the access signal from the iris and periocular region biometric recognition server 1430. In implementations, the access control module 1420 can receive the access signal from a combination of the iris and periocular region biometric recognition device 1410, the iris and periocular region biometric recognition server 1430, and the access control center 1440. In implementations, the access control module 1420 is integrated with the iris and periocular region biometric recognition device 1410. In implementations, the access control module 1420 is integrated with the door 1300. In implementations, the access control module 1420 is a standalone device in communication with the iris and periocular region biometric recognition device 1410, the door 1300, the iris and periocular region biometric recognition server 1430, the access control center 1440, or combinations thereof.

The iris and periocular region biometric recognition server 1430 can receive captured images from the iris and periocular region biometric recognition device 1410. The iris and periocular region biometric recognition server 1430 can perform iris and periocular region biometric recognition as described herein for the iris and periocular region biometric recognition device 1410. The iris and periocular region biometric recognition server 1430 can communicate results to the iris and periocular region biometric recognition device 1410, the access control module 1420, the access control center 1440, or combinations thereof.

The access control center 1440 can be smart monitors, smartphones, computers, desktop computers, handheld computers, personal media devices, notebooks, notepads, phablets and the like which can communicate between the iris and periocular region biometric recognition device 1410, the access control module 1420, the iris and periocular region biometric recognition server 1430, or combinations thereof. The access control center 1440 can review the results from the matching by the iris and periocular region biometric recognition device 1410, the iris and periocular region biometric recognition server 1430, or combinations thereof to determine what access signal should be sent to the access control module 1420.

The network 1500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

FIG. 3 is a diagram of an example access control system 3000 with an example iris and periocular region biometric recognition device 3100 in accordance with implementations of this disclosure. The access control system 3000 can include the iris and periocular region biometric recognition device 3100 in communication with an access control module 3200. The iris and periocular region biometric recognition device 3100 can include an iris and periocular region biometric recognition module 3110, a reference database 3120, a detection module 3130, an image capturing device 3140, one or more illuminator(s) 3150, and a controller 3160. In implementations, the iris and periocular region biometric recognition device 3100 can include an iris and periocular region biometric enrollment system 3170. In implementations, the iris and periocular region biometric recognition device 3100 and the access control module 3200 can be an integrated device. In implementations, the iris and periocular region biometric recognition device 3100 and the access control module 3200 can be connected standalone devices. The access control system 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The detection module 3130 can be a motion sensor, a proximity sensor, and like device which can determine the presence of an individual or whether an individual is proximate to an access controlled device. The detection module 3130 can awaken or signal the access control system 3000, the iris and periocular region biometric recognition device 3100, or combinations thereof of the presence of the individual. In implementations, the access control system 3000 can be in a low power mode or on persistently to perform scanning. Activation of the access control system 3000 occurs when the scanning finds a scannable object.

The image capturing device 3140 can be a camera, an imager, or like device for capturing one or more images of the individual. In implementations, the image capturing device 3140 is a near infrared image capturing device. In implementations, image capturing device 3140 can be a near infrared image capturing device and a visible image capturing device.

The one or more illuminator(s) 3150 can be one or more light sources, light emitting diodes, and the like which can illuminate the individual in coordination with capturing an image of the individual. In implementations, the one or more illuminator(s) 3150 can be near infrared light sources, near infrared light emitting diodes (LEDs), and the like. In implementations, filters can be used to direct near infrared wavelengths toward the image capturing device. In implementations, the one or more illuminator(s) 3150 can be visible light sources including ambient light, visible light emitting diodes (LEDs), near infrared light sources including ambient light, near infrared light emitting diodes (LEDs), and the like.

The iris and periocular region biometric recognition module 3110 can perform iris and periocular region biometric recognition on the captured images as described herein. In implementations, the iris and periocular region biometric recognition module 3110 finds the appropriate or applicable iris and periocular region image portion in the capture imaged, encodes and generates appropriate or applicable iris and periocular region templates, representations, or the like, and matches the iris and periocular region templates to enrolled templates stored in the reference database 3120. The iris and periocular region biometric recognition module 3110 can send matching results to the access control module 3200. In implementations, the results can be scores, a decision, or combinations thereof.

The reference database 3120 can include iris templates, periocular region templates, and other like templates for individuals enrolled in the access control system 3000.

The controller 3160 can control and coordinate the operation of the detection module 3130, the image capturing device 3140, the one or more illuminator(s) 3150, and if applicable, the iris and periocular region biometric enrollment system 3170.

The iris and periocular region biometric enrollment system 3170 can enroll individuals into the access control system 3000. The image capturing device 3140 and the one or more illuminator(s) 3150 can capture images of individuals which are processed by the iris and periocular region biometric recognition module 3110 to generate iris templates and periocular region templates. The iris templates and periocular region templates can then be stored in the reference database 3120 for matching analysis by the iris and periocular region biometric recognition module 3110.

The access control module 3200 can receive matching results from the iris and periocular region biometric recognition device 3100. If a positive match occurs, the access control module 3200 can open or unlock the access controlled entity for the individual or send a signal to the access controlled entity, which in turn can cause the access controlled entity to open or unlock. In implementations, the access control module 3200 can access other security systems to determine security, access, authorization levels or the like for a matched individual. That is, the iris and periocular region biometric recognition is one of multiple steps in providing access to a secured asset.

FIG. 4 is a diagram of an example iris and periocular region biometric recognition server 4000 for use with the access control system 3000 of FIG. 3 in accordance with implementations of this disclosure. The iris and periocular region biometric recognition server 4000 can include an iris and periocular region biometric recognition module 4100, a reference database 4200, a controller 4300, and an iris and periocular region biometric enrollment system 4400. The iris and periocular region biometric recognition server 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The iris and periocular region biometric recognition server 4000 can communicate with the access control system 3000, the iris and periocular region biometric recognition device 3100, the access control module 3200, and combinations thereof via a network such as network 1500. The iris and periocular region biometric recognition module 4100 can operate as described for iris and periocular region biometric recognition module 3110. The reference database 4200 can operate as described herein for the reference database 3120. The controller 4300 can control and coordinate the operation of the iris and periocular region biometric recognition device 3100, the access control module 3200, the iris and periocular region biometric recognition module 4100, the reference database 4200, the iris and periocular region biometric enrollment system 4400, and combinations thereof.

Figure 5:
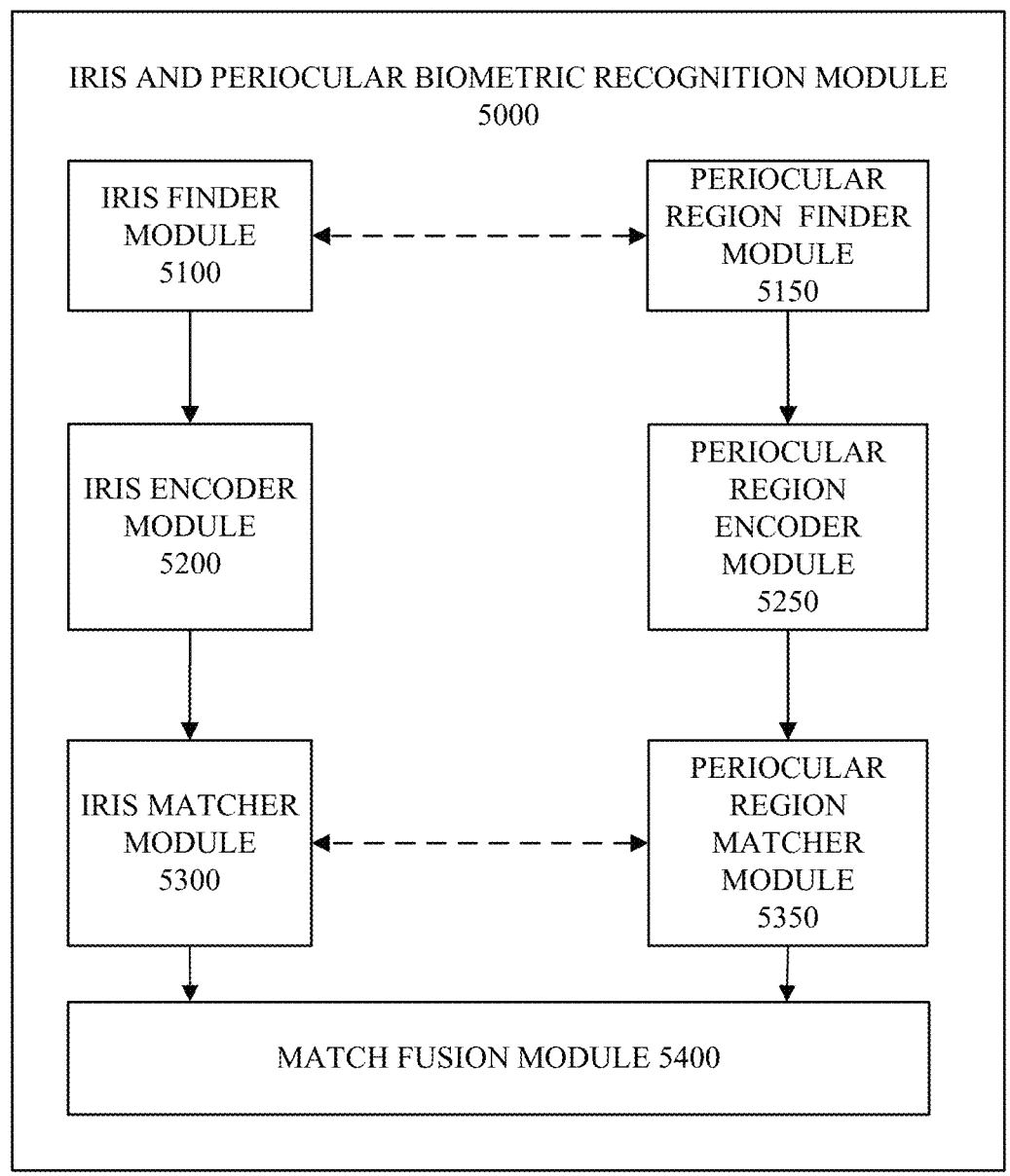
FIG. 5 is a diagram of an example iris and periocular region biometric recognition module in accordance with implementations of this disclosure.

FIG. 5 is a diagram of an example iris and periocular region biometric recognition module 5000 in accordance with implementations of this disclosure. In implementations, the iris and periocular region biometric recognition module 5000 is the iris and periocular region biometric recognition module 3110 in FIG. 3 and the iris and periocular region biometric recognition module 4100 in FIG. 4. The iris and periocular region biometric recognition module 5000 can include an iris finder module 5100, a periocular region finder module 5150, an iris encoder module 5200, a periocular region encoder module 5250, an iris matcher module 5300, a periocular region matcher module 5350, and a match fusion module 5400.

The iris finder module 5100 can locate one or more irises of the individual and perform iris segmentation to generate iris information using known iris detection algorithms. In implementations, the iris finder module 5100 can share this information with the periocular region finder module 5150 to assist the periocular region finder module 5150. This can increase speed and efficiencies. The iris encoder module 5200 can encode and generate iris templates based on the iris information. The iris matcher module 5300 can compare the iris templates against iris enrolled templates and provide iris match scores. In implementations, the iris matcher module 5300 can share this information with the periocular region matcher module 5350 to assist the periocular region matcher module 5350. In implementations, the iris matcher module 5300 can provide results using a variety of known techniques.

The periocular region finder module 5150 can locate or extract features of the individual's periocular region including eyes, eyelids, eyelashes, eyebrows, eye sockets, and the surrounding tissue (collectively "landmarks"). In implementations, the periocular region finder module 5150 can share this information with the iris finder module 5100 to assist the iris finder module 5100. This can increase speed and efficiencies. The periocular region encoder module 5250 can encode the landmarks and generate a periocular region template. The periocular region matcher module 5350 can compare the periocular region template against periocular region enrolled templates and provide periocular region match scores. In implementations, the periocular region matcher module 5350 can share this information with the iris matcher module 5300 to assist the iris matcher module 5300. In implementations, the periocular region matcher module 5350 can provide results using a variety of known techniques.

The match fusion module 5400 can analyze the iris match scores and the periocular region match scores and provide a list of highest match scores. In implementations, the match fusion module 5400 can use any number of techniques including, for example, weighted scores, linear averaging, and the like to determine the list of highest match scores.

In implementations, the iris finder 5100, the iris encoder module 5200, and the iris matcher module 5300 can execute in parallel with the periocular region finder 5150, the periocular region encoder module 5250, and the periocular region matcher module 5350. This can increase speed and efficiencies.

Operationally, with reference to FIGS. 1-5, an individual 1200 self-aligns to a single camera or is automatically aligned to a single camera, such as image capturing device 3140, in the iris and periocular region biometric recognition device 1410. The single camera, in conjunction with near infrared illuminators, such as one or more illuminator(s) 3150, can produce an image or set of images of the individual 1200. In particular, each image can include the periocular region of the individual 1200 with sufficient resolution to capture iris texture needed for iris recognition. Each captured image or frame is submitted for analysis to a pair of algorithmic subsystems. The first analytic subsystem performs standard eye-finding, iris segmentation and iris encoding upon the one or both found irises. For example, the first analytic subsystem can be the iris finder 5100 and the iris encoder module 5200. The second analytic subsystem extracts and encodes features of the individual's 1200 periocular region including eyes, eyelids, eyelashes, eyebrows, eye sockets and the surrounding tissue. For example, the second analytic subsystem can be the periocular region finder 5150 and the periocular region encoder module 5250.

Two templates are formed for each frame, an iris template of one or both irises and a periocular region template. Each of the templates is submitted to a separate recognition or matching algorithm in parallel. The iris matching algorithm, for example as implemented in the iris matcher module 5300, seeks a match to the iris template(s) from among enrolled iris templates. At the same time or in parallel, the periocular region matching algorithm, for example as implemented in the periocular region matcher module 5350, seeks a match to the analyzed periocular feature from among the enrolled list of periocular features. One or both parallel matchers might return with one or more matches. The results are fused, for example as implemented by the match fusion module 5400, to provide individual identifying decisions.

In implementations, the individual 1200 self-aligns to a camera or is automatically aligned to a camera, such as image capturing device 3140, in the iris and periocular region biometric recognition device 1410. The camera, in conjunction with illuminators, such as one or more illuminator(s) 3150, can produce near infrared and visible images of the individual 1200. In particular, the near infrared image can include the periocular region of the individual 1200 with sufficient resolution to capture iris texture needed for iris recognition. Each captured near infrared image or frame is submitted for analysis to the pair of algorithmic subsystems. Each captured visible image is submitted to the second analytic subsystem. The first analytic subsystem and the processing described above is executed with respect to the near infrared image. The second analytic subsystem and the processing described above further includes using the captured near infrared image, the captured visible image, or both to form one or more periocular region templates which undergo matching by the periocular region matcher module 5350. That is, the first analytic subsystem uses the captured near infrared image(s) or frame(s) to extract and form iris templates and the second analytic subsystem uses the captured near infrared image(s) or frame(s) and the captured visible image(s) and frame(s) to extract and form periocular region templates.

Figure 6:
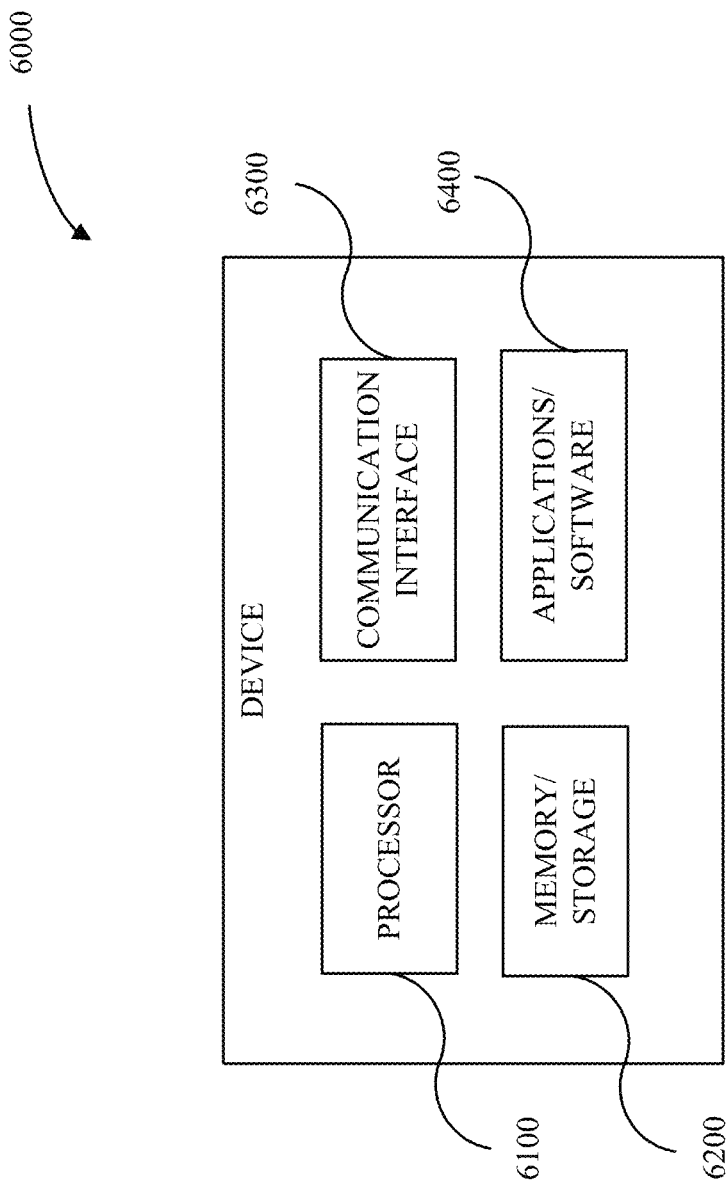
FIG. 6 is a block diagram of an example of a device in accordance with implementations of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 6000 may include or implement, for example, the access control system 1400, the iris and periocular region biometric recognition device 1410, the access control module 1420, the iris and periocular region biometric recognition server 1430, the access control center 1440, the access control system 3000, the iris and periocular region biometric recognition device 3100, the access control module 3200, the iris and periocular region biometric recognition module 3110, the reference database 3120, the detection module 3130, the image capturing device 3140, the one or more illuminator(s) 3150, the controller 3160, the iris and periocular region biometric enrollment system 3170, the iris and periocular region biometric recognition server 4000, the iris and periocular region biometric recognition module 4100, the reference database 4200, the controller 4300, the iris and periocular region biometric enrollment system 4400, the iris and periocular region biometric recognition module 5000, the iris finder module 5100, the periocular region finder module 5150, the iris encoder module 5200, the periocular region encoder module 5250, the iris matcher module 5300, the periocular region matcher module 5350, and the match fusion module 5400, for example. In an implementation, appropriate memory/storage 6200 may store the image(s), the iris information, the periocular region information, the iris template(s), the periocular region template, iris match scores, periocular region match scores, and the list of matched scores. In an implementation, appropriate memory/storage 6200 is encoded with instructions for at least iris and periocular region biometric recognition and access control. The iris and periocular region biometric recognition techniques or methods described herein may be stored in appropriate memory/storage 6200 and executed by the appropriate processor 6100 in cooperation with the memory/storage 6200, the communications interface 6300, and applications 6400, as appropriate. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 7:
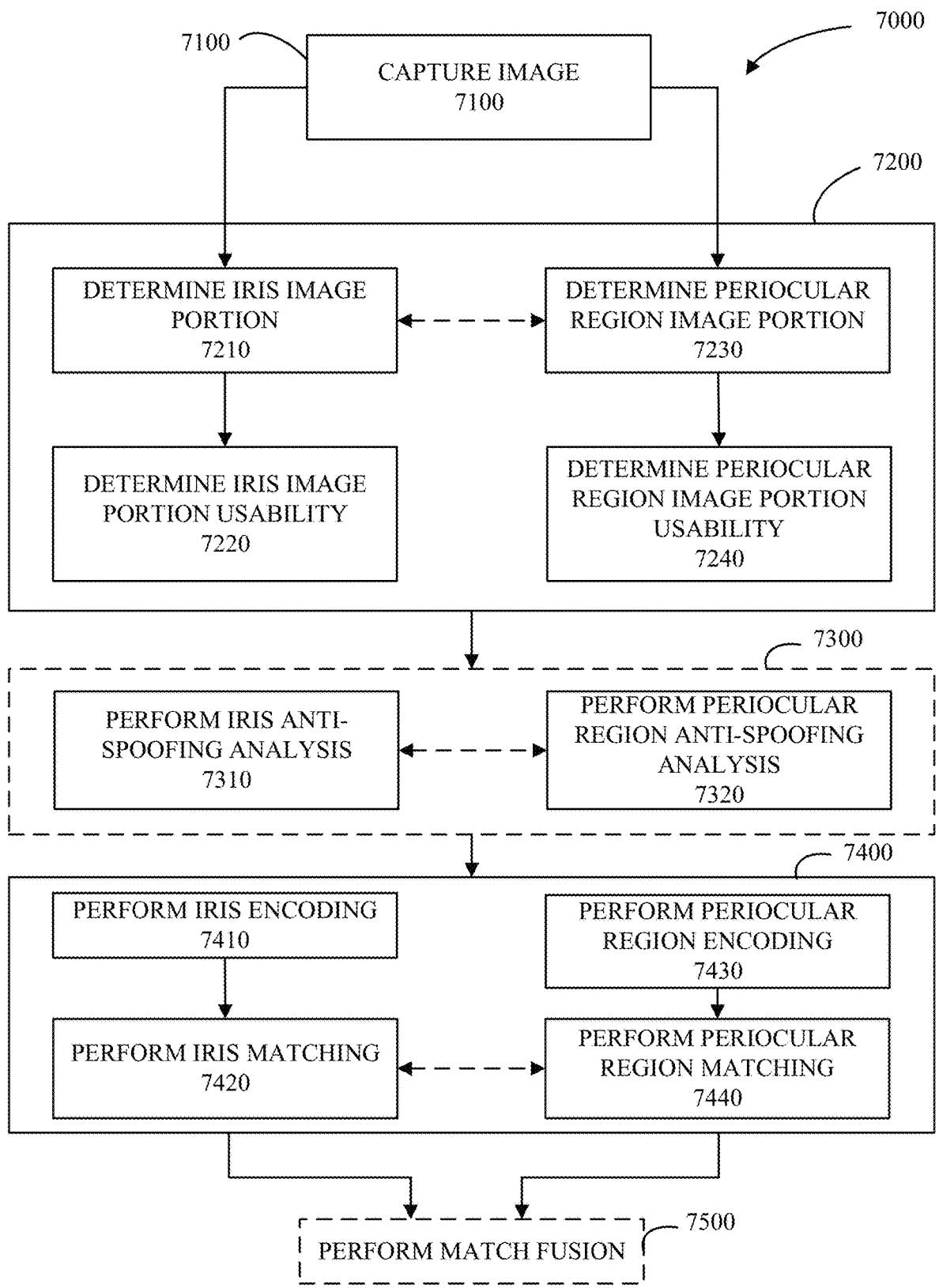
FIG. 7 is a flowchart of an example method for iris and periocular region biometric recognition in accordance with implementations of this disclosure.

FIG. 7 is a flowchart of an example method 7000 for iris and periocular region biometric recognition in accordance with embodiments of this disclosure. The method 7000 includes: capturing 7100 an image; finding 7200 an iris image portion, a periocular image portion, or both; executing 7300 anti-spoofing analysis on the iris image portion, the periocular image portion, or both; determining 7400 an iris result, a periocular result, or both; and determining 7500 a fusion score based on the iris result, the periocular result, or both. In implementation, the order of operations, for example, anti-spoof testing before or after matching, can be tailored to the specific implementation to favor speed or accuracy as needed. For example, the method 7000 may be implemented, as applicable and appropriate, by the architecture or system 1000 of FIG. 1, the access control system 1400 of FIG. 1, the iris and periocular region biometric recognition device 1410 of FIG. 1, the access control module 1420 of FIG. 1, the iris and periocular region biometric recognition server 1430 of FIG. 1, the access control center 1440 of FIG. 1, the access control system 3000 of FIG. 3, the iris and periocular region biometric recognition device 3100 of FIG. 3, the access control module 3200 of FIG. 3, the iris and periocular region biometric recognition module 3110 of FIG. 3, the reference database 3120 of FIG. 3, the detection module 3130 of FIG. 3, the image capturing device 3140 of FIG. 3, the one or more illuminator(s) 3150 of FIG. 3, the controller 3160 of FIG. 3, the iris and periocular region biometric enrollment system 3170 of FIG. 3, the iris and periocular region biometric recognition server 4000 of FIG. 4, the iris and periocular region biometric recognition module 4100 of FIG. 4, the reference database 4200 of FIG. 4, the controller 4300 of FIG. 4, the iris and periocular region biometric enrollment system 4400 of FIG. 4, the iris and periocular region biometric recognition module 5000 of FIG. 5, the iris finder module 5100 of FIG. 5, the periocular region finder module 5150 of FIG. 5, the iris encoder module 5200 of FIG. 5, the periocular region encoder module 5250 of FIG. 5, the iris matcher module 5300 of FIG. 5, the periocular region matcher module 5350 of FIG. 5, and the match fusion module 5400 of FIG. 5, and the processor 6100 of FIG. 6.

The method 7000 includes capturing 7100 an image. In implementations, one or more image capturing devices use one or more illuminators to capture one or more frames of images of a face or facial portion of a user. In implementations, a single near-infrared image capturing device uses a near-infrared illuminator to capture one or more near-infrared frames of images of a face or facial portion of a user. In implementations, a single near-infrared image capturing device uses a near-infrared illuminator to capture one or more near-infrared frames of images of an iris, a periocular region, or both of a user. In implementations, a near-infrared image capturing device uses a near-infrared illuminator to capture one or more near-infrared frames of images of a face or facial portion of a user and a visible image capturing device uses a visible illuminator to capture one or more visible light frames of images of a face or facial portion of a user. In implementations, a near-infrared image capturing device uses a near-infrared illuminator to capture one or more near-infrared frames of images of an iris, a periocular region, or both of a user, and a visible capturing device uses a visible illuminator to capture one or more visible frames of images of a periocular region of a user.

The method 7000 includes finding 7200 an iris image portion, a periocular region image portion, or both. In implementations, the finding 7200 outputs at least one of a usable iris image portion, a usable periocular region image portion, or both from a single frame. In implementations, the iris image portion, the periocular image portion, or both are determined from one near-infrared frame. The finding 7200 includes determining 7210 the iris image portion, determining 7220 usability of the determined iris image portion, determining 7230 the periocular region image portion, and determining 7240 usability of the determined periocular region image portion. The execution of the determining 7210, the determining 7220, the determining 7230, and the determining 7240 can be parallel, sequential, order reversed, or combinations thereof. In implementations, the results from the determining 7210 can be used by the determining 7230 to assist in determination of the periocular region image portion. For example, periocular region landmark projections based on the determined iris image portion can be used to determine the periocular region image portion. Other techniques based on relative geometry between the iris and the periocular region can be used to determine the periocular region. In implementations, the results from the determining 7230 can be used by the determining 7210 to assist in determination of the iris image portion. For example, periocular region landmarks can be used to determine the iris image portion. Other techniques based on relative geometry between the iris and the periocular region can be used to determine the periocular region. In implementations, the determining 7210 and the determining 7230 can exchange information to assist in the determination of the iris image portion and the periocular region image portion as appropriate. In implementations, the determining 7220 can determine if the determined iris image portion is sufficient for iris encoding purposes. In implementations, the determining 7240 can determine if the determined periocular region image portion is sufficient for periocular region encoding purposes. In implementations, the determining 7220 can determine if the lighting, resolution, clarity, and other aspects of the frame are sufficient to determine the iris. In implementations, the determining 7240 can determine if the lighting, resolution, clarity, and other aspects of the frame are sufficient to determine the periocular region. In implementations, the processing described herein can be performed on a near infrared frame for the iris and periocular region, on a near infrared frame for the iris and on a visible frame for the periocular region, or combinations thereof.

The method 7000 includes executing 7300 anti-spoofing analysis on the iris image portion, the periocular image portion, or both. The executing 7300 includes performing 7310 anti-spoofing analysis of the usable determined iris image portion, performing 7320 anti-spoofing analysis of the usable determined periocular region image portion, or both. For example, a spoof can be a non-live substitution of a live sample of a face, facial portion, iris, and the like. That is, the non-live item is changed in for a live item. In implementations, the results from the performing 7310 can be used by the performing 7320 to assist in determination of liveness of the periocular region image portion. In implementations, the results from the determining 7210 can be used by the determining 7220 to assist in determination of liveness of the iris image portion. The execution of the performing 7310 and the performing 7320 can be parallel, sequential, order non-specific, or combinations thereof. In implementations, the executing 7300 outputs the at least one usable determined iris image portion, the usable determined periocular region image portion, or both if the usable determined iris image portion, the usable determined periocular region image portion, or both pass the anti-spoofing analysis. In implementations, the executing 7300 outputs the at least one usable determined iris image portion, the usable determined periocular region image portion, or both if at least one of the usable determined iris image portion, the usable determined periocular region image portion, or both pass the anti-spoofing analysis. In implementations, the anti-spoofing analysis can use scores from each anti-spoofing analysis to determine user liveness. In implementations, the scores can be weighted. In implementations, the executing 7300 outputs the at least one usable determined iris image portion, the usable determined periocular region image portion, or both based on individual scores or a combined score. In implementations, the method 7000 can skip the executing 7300 anti-spoofing analysis.

The method 7000 includes determining 7400 an iris result, a periocular result, or both. The determining 7400 includes performing 7410 iris encoding on a live iris image portion, performing 7420 iris matching, performing 7430 periocular region encoding on a live periocular region image portion, and performing 7440 periocular region matching. The execution of the performing 7410 followed by the performing 7420, and the performing 7430 followed by the performing 7440 can be parallel, sequential, or combinations thereof. In implementations, the results from the performing 7420 can be used by the performing 7440 to assist in periocular region matching. For example, one or more enrolled datasets can be eliminated from the search based on the iris matching results. In implementations, the results from the performing 7440 can be used by the performing 7420 to assist in determination of the iris matching. For example, one or more enrolled datasets can be eliminated from the search based on the periocular region matching results. In implementations, the performing 7420 and the performing 7440 can exchange information to assist in the matching of the iris and the periocular region as appropriate. Each of the performing 7410, the performing 7420, the performing 7430, and the performing 7440 can use methods or techniques as available for iris encoding, iris matching, periocular region encoding, and periocular region matching. Results from the iris matching, periocular region matching, or both can include, one or more scores, an iris matching decision, a periocular region matching decision, or combinations thereof.

The method 7000 includes determining 7500 a fusion score based on the iris result and the periocular result. In implementations, the fusion score is based on a weighted combination of the iris result and the periocular result. In implementations, the weighted combination is linear, non-linear, or combinations thereof. In implementations, the method 7000 can skip the determining 7500 the fusion score.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for biometric recognition, the method comprising:
    capturing one or more image frames of at least a facial portion of a user;
    determining an iris image portion and a periocular region image portion from the one or more image frames;
    performing iris encoding on a live iris image portion to generate an iris template;
    performing periocular region encoding on a live periocular region image portion to generate a periocular region template;
    performing iris matching on the iris template to generate an iris result;
    performing periocular region matching on the periocular region template to generate a periocular region result; and
    using one or more of the iris result and the periocular region result to enable the user to access an object,
    wherein the determined iris image portion and the determined periocular region image portion are exchanged to assist in the determining of the periocular region image portion and the iris image portion, respectively.

2. The method of claim 1, the method further comprising:
    performing anti-spoofing analysis on the determined iris image portion and the determined periocular region image portion to determine user liveness.

3. The method of claim 2, wherein results from the anti-spoofing analysis on the determined iris image portion and the results from the anti-spoofing analysis on the determined periocular region image portion are exchanged to assist in the anti-spoofing analysis on the determined periocular region image portion and the anti-spoofing analysis on the determined iris image portion, respectively.

4. The method of claim 1, wherein the iris matching information and the periocular region matching information are exchanged to assist in the periocular region matching and the iris matching, respectively.

5. The method of claim 1, further comprising:
    generating a biometric recognition result by fusing the iris result and the periocular region result.

6. The method of claim 1, wherein the one or more image frames is one or more near-infrared image frames and one or more visible image frames.

7. The method of claim 6, wherein the one or more near-infrared image frames and one or more visible image frames is one near-infrared image frame and one visible image frame.

8. The method of claim 1, wherein the one or more image frames is one or more near-infrared image frames.

9. The method of claim 8, wherein the one or more near-infrared image frames is one near-infrared image frame.

10. The method of claim 1, wherein the determined periocular region image portion is used to screen and obtain a subset of entries from a database having a threshold probability.

11. The method of claim 10, wherein the iris result is based on the subset of entries.

12. The method of claim 1, wherein the determined iris image portion is used to screen and obtain a subset of entries from a database having a threshold probability.

13. The method of claim 12, wherein the periocular region result is based on the subset of entries.

14. A biometric recognition device comprising:
    an image capture device configured to capture one or more image frames of at least a facial portion of a user;
    a processor connected to the image capture device, the processor configured to:
        determine an iris image portion and a periocular region image portion from the one or more image frames;
        perform iris encoding on a live iris image portion to generate an iris template;
        perform periocular region encoding on a live periocular region image portion to generate a periocular region template;
        exchange the iris matching information and the periocular region matching information to assist in periocular region matching and iris matching, respectively;

perform the iris matching on the iris template to generate an iris result;

perform the periocular region matching on the periocular region template to generate a periocular region result; and use one or more of the iris result and the periocular region result to enable the user to access an object.

15. The biometric recognition device of claim 14, wherein the processor configured to perform at least one of:

exchange the determined iris image portion and the determined periocular region image portion to assist in determining the periocular region image portion and the iris image portion, respectively; and exchange anti-spoofing analysis results performed on the determined iris image portion and performed on the determined periocular region image portion to assist in anti-spoofing analysis on the determined periocular region image portion and anti-spoofing analysis on the determined iris image portion, respectively.

16. The biometric recognition device of claim 14, wherein the image capture device is an infrared image capture device configured to capture one or more near-infrared images.

17. A method for biometric recognition, the method comprising:

capturing one or more image frames of at least a facial portion of a user;

determining an iris image portion and a periocular region image portion from the one or more image frames;

performing iris encoding on a live iris image portion to generate an iris template;

performing periocular region encoding on a live periocular region image portion to generate a periocular region template;

performing iris matching on the iris template to generate an iris result;

performing periocular region matching on the periocular region template to generate a periocular region result; and using one or more of the iris result and the periocular region result to enable the user to access an object, wherein the determined periocular region image portion is used to screen and obtain a subset of entries from a database having a threshold probability.

18. The method of claim 17, wherein the iris result is based on the subset of entries.

19. The method of claim 17, wherein the determined iris image portion is used to screen and obtain a subset of entries from a database having a threshold probability.

* * * * *